(12) United States Patent
Saikkonen

(10) Patent No.: US 7,793,622 B2
(45) Date of Patent: Sep. 14, 2010

(54) METHOD OF OPERATING A GAS ENGINE

(75) Inventor: Ari Saikkonen, Vaasa (FI)

(73) Assignee: Wärtsilä Finland Oy, Vaasa (FI)

( * ) Notice: Subject to any disclaimer, the term of this patent is extended or adjusted under 35 U.S.C. 154(b) by 1013 days.

(21) Appl. No.: 11/107,223

(22) Filed: Apr. 15, 2005

(65) Prior Publication Data

US 2005/0229899 A1    Oct. 20, 2005

(30) Foreign Application Priority Data

Apr. 16, 2004   (FI)   ................................. 20045137

(51) Int. Cl.
*F02B 3/06*    (2006.01)
*F02D 19/10*   (2006.01)

(52) U.S. Cl. ................................. 123/27 GE
(58) Field of Classification Search ............... 60/773; 123/299, 300, 304, 431, 1 A, 2, 198 D, 525, 123/526, 27 GE
See application file for complete search history.

(56) References Cited

U.S. PATENT DOCUMENTS

| | | | |
|---|---|---|---|
| 4,583,363 A * | 4/1986 | Urushidani et al. | ........... 60/276 |
| 5,181,493 A * | 1/1993 | Motoyama et al. | ........... 123/431 |
| 5,477,830 A * | 12/1995 | Beck et al. | ................... 123/470 |
| 5,533,329 A * | 7/1996 | Ohyama et al. | ............... 60/773 |
| 5,708,202 A * | 1/1998 | Augustin et al. | .......... 73/119 A |
| 5,887,566 A | 3/1999 | Glauber et al. | |
| 6,095,101 A * | 8/2000 | Pedersen | ................. 123/27 GE |
| 6,722,135 B2 * | 4/2004 | Davis et al. | .................... 60/773 |
| 2002/0013653 A1* | 1/2002 | Ohyama et al. | ............. 701/103 |
| 2002/0073957 A1* | 6/2002 | Urushihara et al. | ......... 123/299 |

FOREIGN PATENT DOCUMENTS

| | | |
|---|---|---|
| FI | 107635 | 7/1998 |
| JP | 2001152881 A | 6/2001 |
| JP | 2003148188 A | 5/2003 |
| JP | 2003343393 A | 12/2003 |
| JP | 2004197625 A | 7/2004 |

* cited by examiner

*Primary Examiner*—Michael Cuff
*Assistant Examiner*—Andrew Nguyen
(74) *Attorney, Agent, or Firm*—Chernoff, Vilhauer, McClung & Stenzel

(57) ABSTRACT

A gas engine has a first fuel feed system, a second fuel feed system and a third fuel feed system. The gas engine is operated by introducing combustion air into a combustion chamber of the engine. In a first mode of operation of the engine, gaseous fuel is added to the combustion air via the first fuel feed system and ignition fuel is injected into the mixture of gaseous fuel and combustion air via the second fuel feed system. In a second mode of operation of the engine, gaseous fuel is added to the combustion air via the first fuel feed system and ignition fuel is injected into the mixture of gaseous fuel and combustion air via the third fuel feed system.

19 Claims, 1 Drawing Sheet

METHOD OF OPERATING A GAS ENGINE

CROSS-REFERENCE TO RELATED APPLICATION

This application claims priority of Finnish Patent Application No. 20045137 filed Apr. 16, 2004.

BACKGROUND OF THE INVENTION

The invention relates to a method of operating a gas engine, i.e. a piston engine running on gaseous fuel.

Typically, the gaseous fuel used as main fuel in a gas engine is fed into the combustion chamber of the engine mixed with air. It is ignited by injecting a very small amount of ignition fuel, which is ignited due to the conditions existing in the combustion chamber and thereby also ignites the gaseous fuel. In this case, as far as the gaseous fuel is concerned, the engine is run according to the Otto process. Conventionally, the ignition fuel is liquid fuel and is injected using a common rail fuel injection system. The common rail fuel injection system is advantageous because it allows the combustion process to be controlled so that the exhaust gas composition is favorable with respect to emission concentrations. However, the common rail system is subject to disadvantage because it may malfunction, leading to an unexpected shutdown of the engine.

In the event that a gas engine is used as a marine engine, the fuel feed system must meet special requirements in order to assure safety and reliability. The most important such requirement is that unexpected shut down of the engine can not be allowed under any circumstances. Because of this, a gas engine used as a marine engine may be provided with a backup fuel feed system based on using only liquid fuel. Typically the backup fuel feed system is hydromechanically controlled, because hydromechanical fuel feed systems are highly reliable. In case there is a malfunction in the common rail fuel feed system affecting running of the engine, the engine transfers from running on gaseous fuel as the main fuel and using liquid ignition fuel supplied by the common rail system to running only on liquid fuel supplied by a hydromechanical fuel feed system and the engine is then run according to the Diesel process.

The backup use of liquid fuel is, however, problematic in the sense that with a hydromechanical system it is impossible to control the combustion process so that it will be the cleanest possible, since the combustion products include, for example, uncombusted hydrocarbons and nitrogen oxides in substantially larger amounts than in normal gas operation. Further, with backup operation, as described above, all the power is produced by using liquid fuel, whereby the fuel consumption is multifold compared to the consumption of liquid fuel as ignition fuel in gas operation. Consequently, the tanks for the liquid fuel will have to be dimensioned taking the space requirement of the marine vessel into consideration, which affects the load capacity of the vessel. Thus, the possibility exists of having insufficient liquid fuel available for use in backup or reserve fuel operation.

The object of the invention is to provide a method by means of which the problems relating to the prior art can be minimized. An especial object of the invention is to provide a method by means of which, among others, the operational reliability of the gas engine can be guaranteed in all situations and at the same time minimize the risk of running out of liquid fuel and to provide a method by means of which the exhaust emissions can be reduced even in backup operation conditions of the gas engine.

SUMMARY OF THE INVENTION

A gas engine that is used in a method embodying the present invention comprises a first fuel feed system, a second fuel feed system and a third fuel feed system, the use of which can be alternated for running the engine in various operation modes. In a method embodying the invention, in the first operation mode of the engine the engine is run by introducing gaseous fuel into the combustion air of the engine via the first fuel feed system, whereby the gaseous fuel is ignited by injecting an ignition fuel into the mixture of combustion air and gaseous fuel via the second fuel feed system. In the second operation mode, the engine is run by still introducing gaseous fuel into the combustion air of the engine and the gaseous fuel is ignited by injecting ignition fuel into the mixture of combustion air and gaseous fuel via the third fuel feed system.

The second operation mode is used at least in situations where there is a malfunction in the second fuel feed system. In order to detect the malfunction, measurement values of operating variables are acquired by the engine control system, and the engine control system compares the measurement values to preset values. In case the difference between the measurement values and the preset values exceeds a preset level, the engine is transferred to the second operation mode. Preferably, at least the fuel pressure of the second fuel feed system is used as an operating variable. In the second fuel feed system the fuel is dosed from a common rail using an electrical control connected to each injector nozzle. Contrary to this, in the third fuel feed system the fuel is dosed by hydromechanical control by means of an injection pump connected to each injector nozzle.

In the second operation mode the third fuel feed system is controlled so that its injection amount is less than 20% of the total fuel amount to be injected in this operation mode and the second fuel feed system is shut off. In this case, however, it might be necessary in practice to lower the maximum output of the engine to about 80% of the output available in the first operation mode because in the second operation mode knock detection is not necessarily reliable. In the second operation mode the output of the engine is regulated mainly by regulating the amount of first fuel.

The invention provides clear advantages in relation to known technology. By using the method embodying the invention a gas engine can be used in case there is a malfunction of the ignition fuel feed system so that the exhaust gas emissions are substantially lower than in reserve fuel operation according to the known technology. Further, use of the method embodying the invention allows considerably increasing the range of liquid reserve fuel in comparison to backup fuel operation according to known technology.

BRIEF DESCRIPTION OF THE DRAWINGS

In the following, the invention is explained by way of example with reference to the appended schematic drawing, in which.

DETAILED DESCRIPTION

Figure 1:
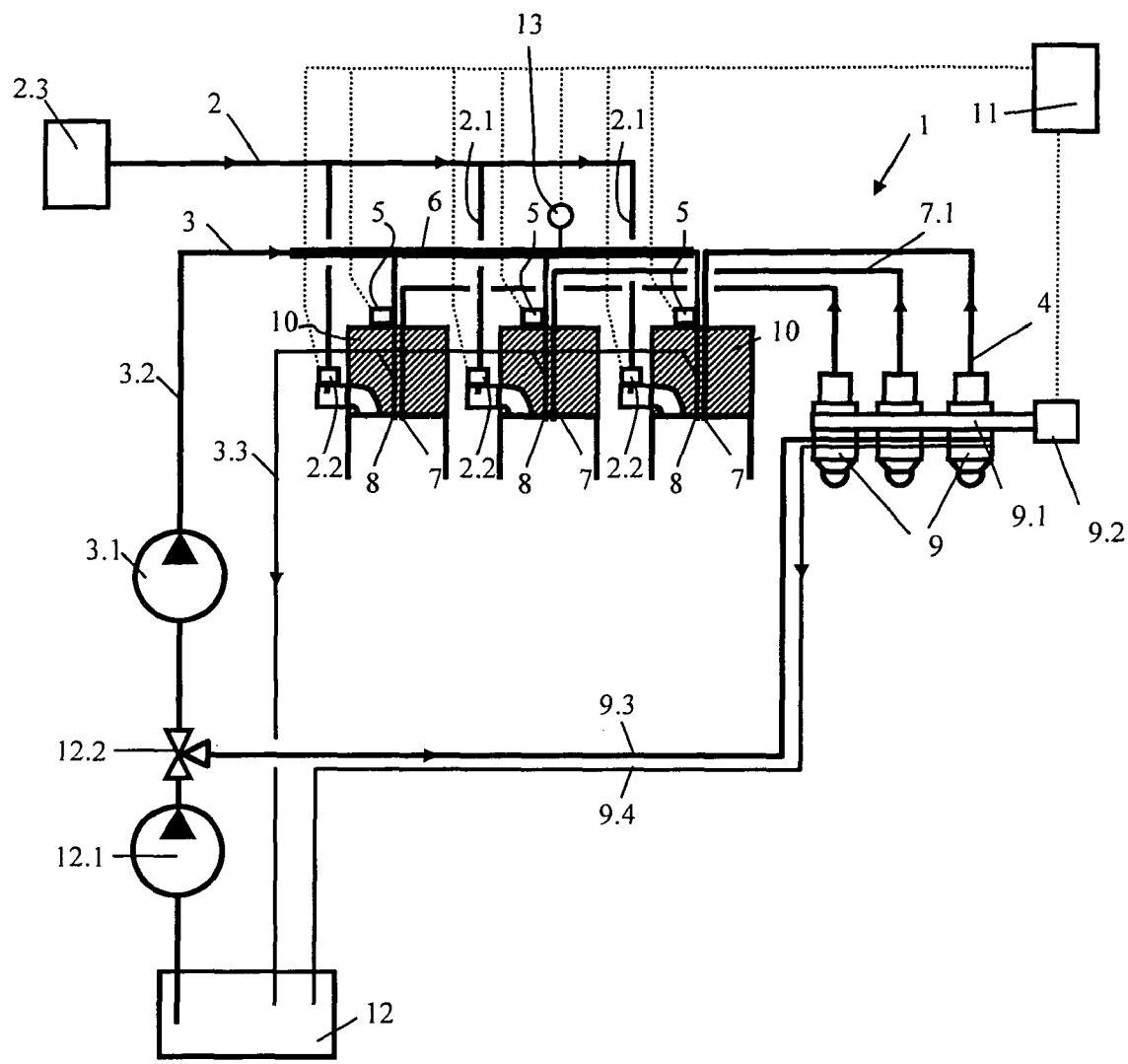
FIG. 1 shows an injection system of an engine that may be operated by a method embodying the invention.

FIG. 1 schematically shows a gas engine having feed channels for introducing combustion air into the combustion chambers of the engine. The engine is provided with a fuel supply system 1 for introducing fuel into the engine. The fuel supply system 1 comprises a first fuel feed system 2 as the main fuel source, via which gaseous fuel can be introduced into the engine. In the text below, gaseous fuel may also be referred to simply as gas. The first fuel feed system comprises inlet piping 2.1 connecting the gas source 2.3 to the feed valves 2.2 of the engine. The gas feed valves are connected to the feed channels of the engine combustion air. The feed valves 2.2 dose the gas supplied via the inlet piping 2.1 into the combustion air. An engine control unit 11 controls the gas feed valves 2.2. During the operation of the engine the control unit 11 controls the opening and closing times of the feed valves as well as the dosing of the gas feed according to, e.g., engine load. The first fuel feed system is here shown in a very schematic way and the parts not necessary for understanding the invention have not been shown.

The engine also comprises a second fuel feed system 3 for liquid fuel. The second fuel feed system feeds ignition fuel to each cylinder of the engine from the fuel tank 12 by means of a nozzle 8 installed in the cylinder head 10. The second fuel feed system 3 is a common rail system and comprises a high-pressure pump 3.1 that increases the fuel pressure to a suitable level, feeding the fuel to the common rail 6 via fuel line 3.2. Excess fuel is returned to the fuel tank via line 3.3. The common rail 6 is connected to each fuel injector nozzle 8. The injector valves of the second fuel feed system are provided with an electrical control apparatus 5 by means of which the amount of fuel is dosed and the timing of the injection is accomplished. The engine control unit 11 is connected to each electrical control apparatus 5 and controls the operation of the second fuel feed system 3.

When combusting gas the engine is run so that the gas is ignited with ignition fuel. Gas is introduced into the engine combustion air by means of the first fuel feed system 2 by opening and closing the gas feed valves 2.2. When a valve 2.2 is open, gas flows into the combustion air and is subsequently ignited in the combustion chamber of the engine, when mixed with the air. Ignition is carried out by injecting a relatively small amount of ignition fuel by means of the second fuel feed system 3. Around the top dead center of the piston, in the final phases of the compression stroke, the conditions in the combustion chamber (or a prechamber connected therewith if used) are such as to ignite the ignition fuel, which also ignites the gas mixed with the combustion air. The amount of the ignition fuel is very small in relation to the amount of main fuel.

The gas engine is additionally provided with a third fuel feed system 4, acting as a backup system for the second fuel feed system 3. The third fuel feed system 4 comprises, in the solution illustrated in the FIGURE, an injection pump 9 for each cylinder of the engine. The injection pumps 9 are connected to the fuel tank 12 via the feed line 9.3 and the return line 9.4. Each injector pump 9 is connected to the injector nozzle 7 by its own fuel line 7.1. The injector nozzles 7 of the third fuel feed system 4 are controlled hydromechanically. Accordingly, each injector nozzle includes a spring-loaded nozzle needle (not shown) wherein the spring provides the force closing the nozzle needle. The nozzle needle is opened by the force of fuel pressure overcoming the force of the spring. The amount of fuel that is injected depends on the angular position of the piston of the injection pump. Accordingly, the amount of fuel that is injected is adjusted by rotating the piston of the injection pump to the desired angular position by moving an adjustment rod 9.1, the method being known as such. An actuator 9.2 is connected to the adjustment rod 9.1 for adjusting the injection of the fuel and thereby controlling the operation of the injection pumps 9 and hence the operation of the third fuel feed system 4. The actuator is connected to the engine control unit 11, to which the actuator 9.2 transmits its position data, the control unit also defining the operation of the actuator.

In the embodiment of FIG. 1 the fuel of both the second and third fuel feed systems 3, 4 is in a common tank 12. The fuel is transferred forward by means of a transfer pump 12.1, subsequent to which the flow is divided into the feed lines 3.2, 9.3 of the respective feed systems by means of the valve 12.2. Each fuel feed system could just as well have its own separate fuel tank, and this would be the case if, e.g., different fuels were used in the second and third fuel feed systems.

The operation of the engine and the injection of the main fuel and ignition fuel are controlled by the control unit 11. Data concerning various operating variables of the engine are also transferred into the control unit. The values of the operating variables of the second fuel feed system 3 are compared to preset values in the control unit 11. For this purpose at least a pressure measurement apparatus 13 is connected to the second fuel feed system 3, from which the pressure measurement value is supplied to the engine control unit at certain intervals. This and possibly other measurement values are compared to the set values stored in the control unit and in case the difference between the measurement values and the preset values is larger than a predetermined threshold, the system is transferred into the second operation mode, which is described in the following.

In the second operation mode the engine is still operated by introducing gas into the engine combustion air via the first fuel feed system 2 as in the first operation mode. Now, however, the control system of the engine controls the actuator 9.2 of the third fuel feed system to start and maintain fuel injection via the injector nozzles 7 of the third fuel feed system. Simultaneously therewith or immediately thereafter the engine control unit 11 controls the electrical control apparatus 5 of the second fuel feed system to stop injecting fuel via its injector nozzles 8 into the engine combustion chamber.

Thus the operation of the engine can continue essentially without disturbances so that the gaseous fuel is ignited by injecting ignition fuel via the third fuel feed system 3 into the mixture of combustion air and gaseous fuel. In this second operation mode the third fuel feed system is run at a nearly constant amount of fuel, the amount typically being less than 20% of the total amount of fuel. Thus, the output of the engine is adjusted by adjusting the amount of gas to be fed.

According to the invention, the feed capacity of the third fuel feed system is such as to allow an engine output approximately corresponding to the maximum output of the engine in gas operation. Because of this, the engine can still, when necessary, be used in a third operation mode, in which the fuel injection is carried out only via the third fuel feed system 4. In this case, the control unit 11 controls both the first and second fuel feed systems 2, 3 to stop feeding fuel and the output of the engine is adjusted only by adjusting the actuator 9.2 of the third fuel feed system.

The invention is not limited to the embodiments described here, but a number of modifications thereof can be conceived of within the scope of the appended claims.

The invention claimed is:

1. A method of operating a gas engine comprising introducing combustion air into a combustion chamber of the engine and, in a first mode of operation of the engine, adding gaseous fuel to the combustion air outside the combustion chamber via a first fuel feed system and injecting liquid ignition fuel into the mixture of gaseous fuel and combustion air via a second fuel feed system, in a second mode of operation of the engine, shutting down the second feed system, adding gaseous fuel to the combustion chamber via the first fuel feed system and injecting liquid ignition fuel into the mixture of gaseous fuel and combustion air via a third fuel feed system, and controlling the third fuel feed system so that it injects less than 20% of the total fuel amount supplied to the engine, and supplying fuel to both the second and third fuel feed systems from a common tank, whereby the third fuel feed system provides a backup of the second fuel feed system.

2. A method according to claim 1, wherein the second fuel feed system comprises an injector nozzle for injecting the ignition fuel into the combustion chamber of the engine and the first mode of operation includes dosing the injection fuel using an electrical control connected with each injector nozzle from a common rail.

3. A method according to claim 1, wherein the third fuel feed system comprises an injector nozzle for injecting the ignition fuel into the combustion chamber of the engine and the second mode of operation comprises dosing the fuel under hydromechanical control by means of an injector pump connected to the injector nozzle.

4. A method according to claim 1, wherein the second mode of operation comprises adjusting the engine output by controlling supply of gaseous fuel via the first fuel feed system.

5. A method according to claim 1, comprising acquiring measurement values of operating variables of the second fuel feed system, comparing the measurement values to preset values, and transferring operation of the engine to the second mode in the event that the measurement values differ from the preset values by an amount that exceeds a predetermined level.

6. A method according to claim 5, wherein the step of acquiring measurement values includes acquiring measurement values of pressure of fuel supplied by the first fuel feed system.

7. A method according to claim 5, wherein the first fuel feed system is a common rail system and the method comprises measuring pressure of fuel in the common rail.

8. A gas engine comprising:

an air induction means for introducing combustion air into a combustion chamber of the engine, a first fuel feed system for adding gaseous fuel to the combustion air outside the combustion chamber, a second fuel feed system for injecting liquid ignition fuel into the mixture of gaseous fuel and combustion air, a third fuel feed system for injecting liquid ignition fuel into the mixture of gaseous fuel and combustion air, a fuel tank connected to supply fuel to both the second fuel feed system and the third fuel feed system, and an engine control unit for controlling the second and third fuel feed systems such that in a first mode of operation of the engine, the second fuel feed system is shut down, the first fuel feed system adds gaseous fuel to the combustion air and the second fuel feed system injects liquid ignition fuel into the mixture of gaseous fuel and combustion air, and in a second mode of operation of the engine, the first fuel feed system adds gaseous fuel to the combustion air and the third fuel feed system injects liquid ignition fuel into the mixture of gaseous fuel and combustion air, and the third fuel feed system is controlled so that it injects less than 20% of the total fuel amount supplied to the engine, whereby the third fuel feed system provides a backup of the second fuel feed system.

9. A gas engine according to claim 8, wherein the second fuel feed system is a common rail system including a common rail, an injector nozzle for injecting fuel from the common rail into the combustion chamber, and an electrical control unit for controlling the injector nozzle.

10. A gas engine according to claim 8, wherein the third fuel system is a hydromechanical system including an injector nozzle for injecting fuel into the combustion chamber, an injector pump connected to the injector nozzle, and an actuator means coupled to the pump for controlling the pump.

11. A gas engine according to claim 8, comprising a means for acquiring measurement values of an operating variable of the second fuel feed system and supplying the measurement values to the engine control unit when operating in the first mode of operation, and wherein the engine control unit compares the measurement values to preset values and transfers operation to the second mode of operation in the event that the measurement values differ from the preset values by an amount that exceeds a predetermined level.

12. A gas engine according to claim 11, wherein the means for acquiring measurement values comprises a means for acquiring values of fuel pressure.

13. A gas engine according to claim 11, wherein the second fuel feed system is a common rail system and the means for acquiring measurement values includes means for acquiring values of pressure of fuel in the common rail.

14. A gas engine according to claim 8, wherein the air induction means comprises a feed channel for supplying combustion air to the combustion chamber and the first fuel feed system comprises a fuel feed valve connected to the feed channel for adding the gaseous fuel to the combustion air in the feed channel.

15. A method according to claim 1, comprising introducing combustion air into the combustion chamber of the engine by way of a feed channel and adding gaseous fuel to the combustion air via a fuel feed valve connected to the feed channel, and injecting ignition fuel into the mixture of gaseous fuel and combustion air in the combustion chamber.

16. A method of operating a gas engine comprising:

introducing combustion air into a combustion chamber of the engine and adding gaseous fuel to the combustion air outside the combustion chamber via a gaseous-fuel feed system, injecting liquid ignition fuel into the mixture of gaseous fuel and combustion air via a common rail liquid-fuel feed system, in the event of malfunction of the common rail liquid-fuel feed system, shutting down the common rail liquid-fuel feed system, injecting liquid ignition fuel into the mixture of gaseous fuel and combustion air via a hydromechanical liquid-fuel injection system, and controlling the hydromechanical liquid-fuel injection system so that it injects less than 20% of the total fuel amount supplied to the engine, and supplying fuel to both the common rail liquid-fuel feed system and the hydromechanical liquid-fuel feed system from a common tank, whereby the hydromechanical liquid-fuel feed system provides a backup of the common rail liquid-fuel feed system.

17. A method according to claim 16, wherein the common rail liquid-fuel feed system injects liquid injection fuel into the combustion chamber.

18. A method according to claim 16, wherein the hydromechanical liquid-fuel feed system includes an injector nozzle for injecting liquid fuel into the combustion chamber and an injection pump for supplying liquid fuel to the injector nozzle.

19. A method according to claim 18, wherein the gas engine has multiple combustion chambers and the hydromechanical liquid-fuel feed system comprises multiple injector nozzles, for injecting liquid fuel into the combustion chambers respectively, and multiple injection pumps, for supplying liquid fuel to the injector nozzles respectively, and, in the event of malfunction of the common rail liquid-fuel feed system, the hydromechanical liquid-fuel feed system injects liquid ignition fuel into the combustion chambers respectively.

* * * * *